US010643377B2

(12) United States Patent
Grufman et al.

(10) Patent No.: US 10,643,377 B2
(45) Date of Patent: May 5, 2020

(54) GARDEN MAPPING AND PLANNING VIA ROBOTIC VEHICLE

(71) Applicant: HUSQVARNA AB, Huskvarna (SE)

(72) Inventors: Stefan Grufman, Bankeryd (SE); Björn Mannefred, Jönköping (SE); Mikael Willgert, Spånga (SE); Anders Mattsson, Ulricehamn (SE); Peter Reigo, Djursholm (SE)

(73) Assignee: Husqvarna AB, Huskvarna (SE)

( * ) Notice: Subject to any disclaimer, the term of this patent is extended or adjusted under 35 U.S.C. 154(b) by 168 days.

(21) Appl. No.: 15/536,147

(22) PCT Filed: Oct. 19, 2015

(86) PCT No.: PCT/IB2015/058043
§ 371 (c)(1),
(2) Date: Jun. 15, 2017

(87) PCT Pub. No.: WO2016/103067
PCT Pub. Date: Jun. 30, 2016

(65) Prior Publication Data
US 2017/0345210 A1    Nov. 30, 2017

Related U.S. Application Data

(60) Provisional application No. 62/095,391, filed on Dec. 22, 2014.

(51) Int. Cl.
*G06F 3/0484* (2013.01)
*G06T 17/05* (2011.01)
(Continued)

(52) U.S. Cl.
CPC .......... *G06T 17/05* (2013.01); *G05D 1/0038* (2013.01); *G05D 1/027* (2013.01); *G05D 1/0246* (2013.01);
(Continued)

(58) Field of Classification Search
CPC ................................................. G06F 3/04842
(Continued)

(56) References Cited

U.S. PATENT DOCUMENTS 5,838,331 A * 11/1998 DeBry .................... G06T 15/04
345/584
9,298,183 B2 * 3/2016 Artes ................... G05D 1/0219
(Continued)

FOREIGN PATENT DOCUMENTS

| DE | 102012109004 A1 | 3/2014 |
| EP | 2804065 A1 | 11/2014 |
| WO | 2011146254 A2 | 11/2011 |

OTHER PUBLICATIONS

Chris Dannen, "Bing Introduces 3-D Photosynth Maps", available at <https://www.fastcompany.com/1475337/bing-introduces-3-d-photosynth-maps>, archived on Jul. 13, 2013 at wayback machine <http://web-archived.org>, 7 pages (Year: 2013).*

(Continued)

*Primary Examiner* — Daniel Rodriguez
(74) *Attorney, Agent, or Firm* — Burr & Forman LLP (57) ABSTRACT

A method for mapping and planning a parcel or garden may include receiving information indicative of position data of a robotic vehicle transiting a parcel and corresponding image data captured by the robotic vehicle at one or more locations on the parcel. The method may further include generating a base-map of the parcel based on the information received and providing a graphical representation of the parcel based on the base-map. The method may further include enabling an operator to generate a modified-map.

20 Claims, 6 Drawing Sheets

(51) Int. Cl.
*H04L 29/08* (2006.01)
*G05D 1/02* (2020.01)
*G05D 1/00* (2006.01)
*H04W 4/029* (2018.01)

(52) U.S. Cl.
CPC ......... *G05D 1/0274* (2013.01); *G05D 1/0278* (2013.01); *G06F 3/04842* (2013.01); *G06F 3/04845* (2013.01); *H04L 67/125* (2013.01); *G05D 1/0219* (2013.01); *G05D 2201/0208* (2013.01); *H04L 67/12* (2013.01); *H04W 4/029* (2018.02)

(58) Field of Classification Search
USPC .......................................................... 715/764
See application file for complete search history.

(56) References Cited

U.S. PATENT DOCUMENTS

| | | | | |
|---|---|---|---|---|
| 9,471,063 | B2* | 10/2016 | Ouyang | G05D 1/0265 |
| 10,182,533 | B2* | 1/2019 | Anjum | A01G 22/00 |
| 2006/0271287 | A1* | 11/2006 | Gold | G01C 21/26 701/426 |
| 2008/0022790 | A1* | 1/2008 | Lee | G01C 19/42 74/5.4 |
| 2008/0059889 | A1* | 3/2008 | Parker | G06F 16/29 715/748 |
| 2010/0049366 | A1* | 2/2010 | Lee | G05D 1/0274 700/258 |
| 2010/0185382 | A1* | 7/2010 | Barker | G08G 1/0104 701/119 |
| 2010/0245169 | A1* | 9/2010 | O'Connor | G01C 21/20 342/357.25 |
| 2010/0305854 | A1* | 12/2010 | Kammel | G01C 21/005 701/469 |
| 2010/0324731 | A1* | 12/2010 | Letsky | A01D 34/008 700/245 |
| 2011/0264303 | A1* | 10/2011 | Lenser | G05D 1/0038 701/2 |
| 2012/0143488 | A1* | 6/2012 | Othmezouri | B60T 7/22 701/301 |
| 2012/0249741 | A1* | 10/2012 | Maciocci | G06F 3/017 348/46 |
| 2012/0265391 | A1* | 10/2012 | Letsky | A01D 34/008 701/25 |
| 2012/0274625 | A1* | 11/2012 | Lynch | G06T 17/05 345/419 |
| 2012/0299702 | A1* | 11/2012 | Edara | G01S 19/49 340/8.1 |
| 2013/0006419 | A1* | 1/2013 | Bergstrom | A01D 34/008 700/245 |
| 2013/0120544 | A1* | 5/2013 | Du | H04N 13/167 348/51 |
| 2013/0268118 | A1* | 10/2013 | Grinstead | B25J 19/023 700/259 |
| 2013/0282224 | A1* | 10/2013 | Yazaki | A01D 34/008 701/24 |
| 2014/0035752 | A1* | 2/2014 | Johnson | A01G 22/00 340/601 |
| 2014/0298229 | A1* | 10/2014 | Priest | G06Q 10/04 715/771 |
| 2014/0298230 | A1* | 10/2014 | Priest | G06F 30/00 715/771 |
| 2014/0316636 | A1* | 10/2014 | Hong | G01C 21/206 701/27 |
| 2014/0343783 | A1* | 11/2014 | Lee | A47L 9/2894 701/25 |
| 2014/0379228 | A1* | 12/2014 | Batcheller | A01C 21/005 701/50 |
| 2014/0379256 | A1* | 12/2014 | Stipes | G01C 21/165 701/501 |
| 2015/0081058 | A1* | 3/2015 | Oliver | A63F 13/245 700/91 |
| 2015/0296707 | A1* | 10/2015 | Fukuda | A01D 34/008 701/25 |
| 2015/0323337 | A1* | 11/2015 | Aiello | G01C 21/36 701/533 |
| 2016/0008982 | A1* | 1/2016 | Artes | B25J 5/00 700/254 |
| 2016/0100522 | A1* | 4/2016 | Yamauchi | G05D 1/0236 701/25 |
| 2016/0165795 | A1* | 6/2016 | Balutis | G05D 1/0265 701/25 |
| 2016/0174459 | A1* | 6/2016 | Balutis | B25J 9/1674 701/25 |
| 2017/0206222 | A1* | 7/2017 | Kaminka | G06K 9/20 |
| 2017/0212518 | A1* | 7/2017 | Iimura | G05D 1/0214 |

OTHER PUBLICATIONS

International Search Report and Written Opinion for International Application No. PCT/IB2015/058043 dated May 27, 2016.
International Preliminary Report on Patentability for International Application No. PCT/IB2015/058043 dated Jun. 27, 2017.
Hiroki.Sasabuchi et al., "A map building system for Mobile Intelligent Space using human-following robot", IECON 2013—39th Annual Conference of the IEEE Industrial Electronics Society, IEEE, pp. 7804-7809, Nov. 10, 2013.

* cited by examiner

GARDEN MAPPING AND PLANNING VIA ROBOTIC VEHICLE

CROSS REFERENCE TO RELATED APPLICATIONS

The present application claims priority to U.S. patent application Ser. No. 62/095,391 filed Dec. 22, 2014, which is expressly incorporated by reference in its entirety.

TECHNICAL FIELD

Example embodiments generally relate to robotic devices and, more particularly, relate to a robotic device that is configurable to facilitate generation of a map of a garden that may be used by an operator to plan or design the layout of the garden for the future.

BACKGROUND

Yard maintenance tasks are commonly performed using various tools and/or machines that are configured for the performance of corresponding specific tasks. Certain tasks, like grass cutting, are typically performed by lawn mowers. Lawn mowers themselves may have many different configurations to support the needs and budgets of consumers. Walk-behind lawn mowers are typically compact, have comparatively small engines and are relatively inexpensive. Meanwhile, at the other end of the spectrum, riding lawn mowers, such as lawn tractors, can be quite large. More recently, robotic vehicles and/or remote controlled mowers have also become options for consumers to consider.

Robotic vehicles are typically capable of transiting over even and uneven terrain to execute yard maintenance activities relating to mowing. They may be programmed to stay within a defined area while performing their mowing tasks, and may even be configured to perform other tasks in the defined area. Thus, it may be desirable to expand the capabilities of robotic vehicles to improve their utility and functionality.

BRIEF SUMMARY OF SOME EXAMPLES

Some example embodiments may therefore provide a robotic vehicle that can employ a camera, for example, for use in connection with visualizing and mapping of a garden so that, for example, a base-map of the garden can be generated for user interaction in a variety of ways to provide a modified-map representative of a proposed future configuration or plan for the garden.

In accordance with some example embodiments, a method for mapping a parcel or garden and planning a future configuration for the parcel or garden, which may include virtually reorganizing, adding, and/or removing content objects (e.g., bushes, plants, trees, building structures, walkways, etc.). An example embodiment, for example, may include receiving information indicative of position data of a robotic vehicle transiting a parcel and corresponding image data captured by the robotic vehicle at one or more locations on the parcel. The method may further include generating a base-map of the parcel based on the information received and providing a graphical representation of the parcel based on the base-map. The method may further include enabling an operator generate a modified-map. In some exemplary embodiments, the method may comprise enabling an operator to generate a modified-map comprises enabling an operator to interact with the graphical representation to virtually remove one or more existing objects identified on the base-map, populate the base-map with one or more virtual content objects, or both to provide the modified-map.

In another example embodiment, an apparatus for mapping a parcel or garden and planning a future configuration for the parcel or garden may include processing circuitry configured for receiving information indicative of position data of a robotic vehicle transiting a parcel and corresponding image data captured by the robotic vehicle at one or more locations on the parcel and generating a base-map of the parcel based on the information received. The processing circuitry may further be configured for providing a graphical representation of the parcel based on the base-map and enabling an operator generate a modified-map. The processing circuitry may further be configured for enabling an operator to generate a modified-map comprises enabling an operator to interact with the graphical representation to virtually remove one or more existing objects identified on the base-map, populate the base-map with one or more virtual content objects, or both to provide the modified-map.

Some example embodiments may improve the ability of robotic vehicles to provide utility for garden owners or other operators, specifically by enabling the garden owners or operators to conduct virtual tours of the garden based on data gathered by the robotic vehicles as well as enabling the remote, for example, design (e.g., landscaping design) of the parcel of land.

BRIEF DESCRIPTION OF THE SEVERAL VIEWS OF THE DRAWINGS

Having thus described the invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. Additionally, the term "garden" is meant to relate to any yard, parcel, grounds, or other property that is maintained and/or monitored using equipment. As such, the term garden could refer to an area in which various varieties of vegetation could be cultivated including, for example, grasses, trees, bushes, shrubs, flowers, vegetables, fruits, herbs and/or the like. As used herein, operable coupling should be understood to relate to direct or indirect connection that, in either case, enables functional interconnection of components that are operably coupled to each other.

In an example embodiment, a robotic vehicle (e.g., a robotic vehicle, mobile sensing device, watering device and/or the like) is provided with a camera or other image capture module in addition to any other sensors or functional components that the robotic vehicle may carry. The image capture module, and perhaps also other sensor equipment, may be configured to gather image data and other information during operation of the robotic vehicle in the garden (i.e., on the parcel). The image data may be combined with positioning information to generate a base-map (e.g., a 2D or 3D map) of the parcel. The user may then interact with the base-map to undertake a variety of activities including, for example, virtually reorganizing, virtually adding one or more virtual content objects (e.g., vegetation, building structures, etc.), and/or virtually removing existing objects identified on the base-map. The user may also define virtual discrete areas within the parcel, in which the virtual discrete areas can include one or more virtual content objects (e.g., the discrete are may comprise a proposed flower bed including a variety of proposed flowers therein). The user may also record content for presentation in association with the time the content was recorded to provide an event log with accessible image content, detecting/notifying the operator of various changes to the environment, and/or the like. Other functions may also be performed as described in greater detail below.

Figure 1:
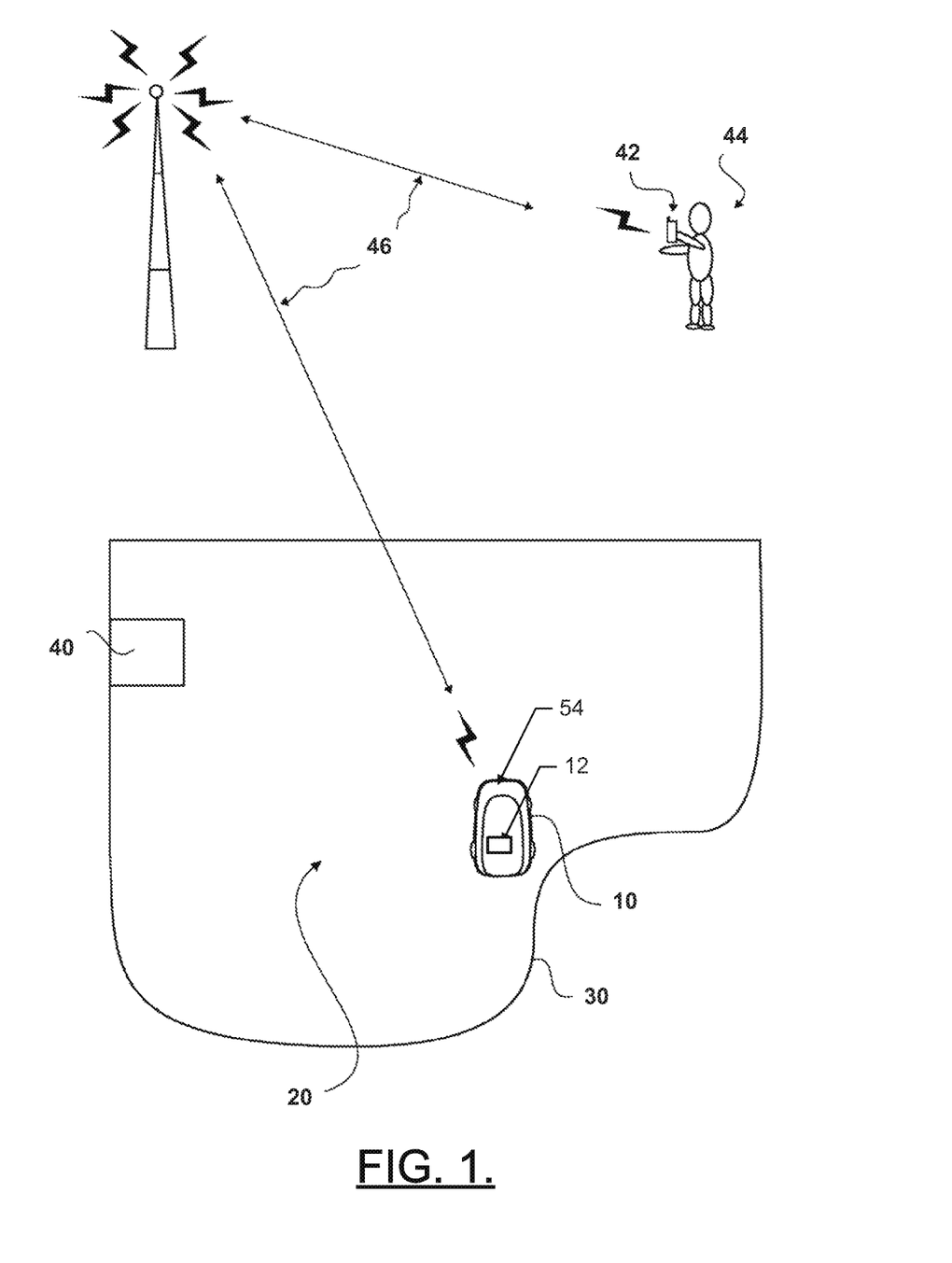
FIG. 1 illustrates an example operating environment for a robotic vehicle that may employ an example embodiment.

FIG. 1 illustrates an example operating environment for a robotic vehicle (e.g., mower) 10 that may employ an example embodiment. However, it should be appreciated that example embodiments may be employed on numerous other robotic vehicles, so the robotic vehicle 10 should be recognized as merely one example of such a vehicle. The robotic vehicle 10 may operate to cut grass on a parcel 20 (i.e., a land lot or garden), the boundary 30 of which may be defined using one or more physical boundaries (e.g., a fence, wall, curb and/or the like), a boundary wire, programmed location based boundaries or combinations thereof. When the boundary 30 is a boundary wire, the boundary wire may emit electrical signals that are detectable by the robotic vehicle 10 to inform the robotic vehicle 10 when the boundary 30 of the parcel 20 has been reached.

The robotic vehicle 10 may be controlled, at least in part, via control circuitry 12 located onboard. The control circuitry 12 may include, among other things, a positioning module and an image capture module, which will be described in greater detail below. Accordingly, the robotic vehicle 10 may utilize the control circuitry 12 to define a path for coverage of the parcel 20 in terms of performing a task over specified portions or the entire parcel 20. In this regard, the positioning module may be used to guide the robotic vehicle 10 over the parcel 20 and to ensure that full coverage (of at least predetermined portions of the parcel 20) is obtained, while the image capture module may detect objects and capture image data regarding the surroundings of the robotic vehicle 10 while the parcel 20 is traversed.

In an example embodiment, the robotic vehicle 10 may be battery powered via one or more rechargeable batteries. Accordingly, the robotic vehicle 10 may be configured to return to a charge station 40 that may be located at some position on the parcel 20 in order to recharge the batteries. The batteries may power a drive system and a blade control system of the robotic vehicle (e.g., robotic mower) 10. However, the control circuitry 12 of the robotic vehicle 10 may selectively control the application of power or other control signals to the drive system and/or the blade control system to direct the operation of the drive system and/or blade control system. Accordingly, movement of the robotic vehicle 10 over the parcel 20 may be controlled by the control circuitry 12 in a manner that enables the robotic vehicle 10 to systematically traverse the parcel while operating a cutting blade, for example, to cut the grass on the parcel 20.

In some embodiments, the control circuitry 12 and/or a communication node at the charge station 40 may be configured to communicate wirelessly with an electronic device 42 (e.g., a personal computer, a cloud based computer, server, mobile telephone, PDA, tablet, smart phone, and/or the like) of a remote operator 44 (or user) via a wireless communication network 46. However, the wireless network 46 and other remote devices may not be employed in some embodiments. For example, the charge station 40 may have a wired connection to a computer of the remote operator 44. In embodiments where the wireless network 46 is employed, the wireless network 46 may be a data network, such as a local area network (LAN), a metropolitan area network (MAN), a wide area network (WAN) (e.g., the Internet), and/or the like, which may couple the robotic vehicle 10 to devices such as processing elements (e.g., personal computers, server computers or the like) or databases. Accordingly, communication between the wireless network 46 and the devices or databases (e.g., servers, electronic device 42, control circuitry 12) may be accomplished by either wireline or wireless communication mechanisms and corresponding protocols.

Figure 2A:
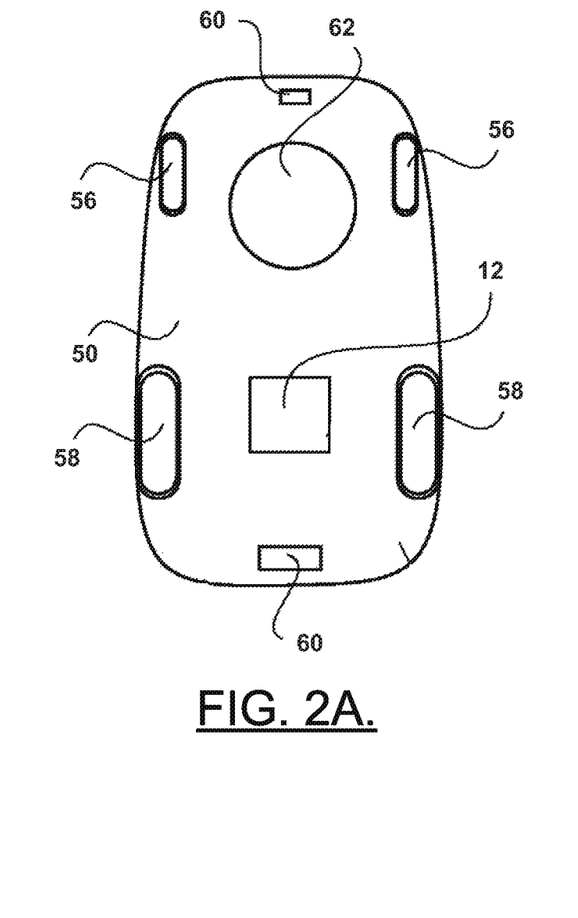
FIG. 2A illustrates a schematic view of a base plate and various components of the robotic vehicle according to an example embodiment.
Figure 2B:
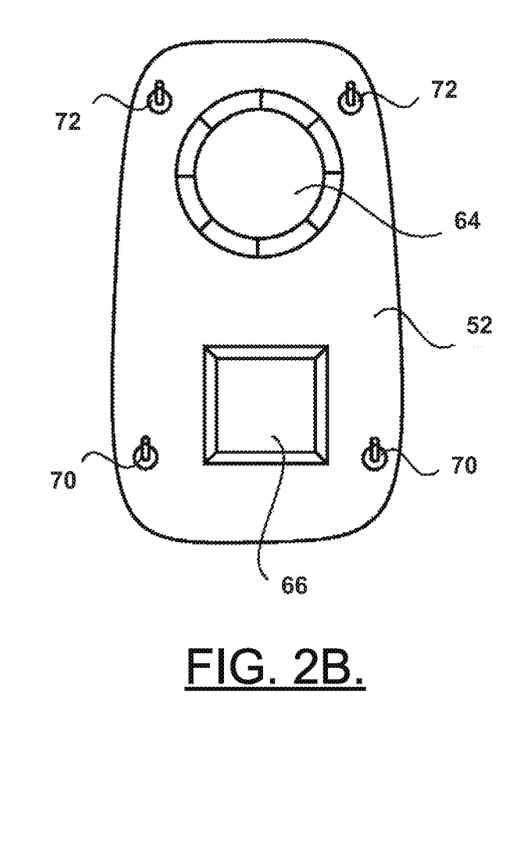
FIG. 2B illustrates a schematic view of an inner housing and various other components of the robotic vehicle according to an example embodiment.

FIG. 2, which includes FIGS. 2A and 2B, illustrates some of the parts that may be employed in connection with an example of the robotic vehicle 10. However, it should be appreciated that example embodiments may be employed on numerous other vehicles that may employ different designs. As such, components described may be excluded in some embodiments and/or additional components may be provided. Moreover, the locations of some components may be moved in some embodiments. FIG. 2A illustrates a schematic view of a base plate and various components of the robotic vehicle according to an example embodiment and FIG. 2B illustrates a schematic view of an inner housing and various other components of the robotic vehicle according to an example embodiment.

Referring to FIGS. 1 and 2, the robotic vehicle 10 of one example embodiment may include a base plate 50, an inner housing 52 and an outer housing 54. The inner housing 52 may be configured to be arranged on top of a base plate 50 and the outer housing 54 may be configured to be arranged on top of the inner housing 52. The base plate 50 may form a support structure from which one or more front wheels 56 and one or more rear wheels 58 may be supported. In some embodiments, the one or more rear wheels 58 may be relatively large as compared to the one or more front wheels 56. Moreover, the one or more rear wheels 58 may be configured to operate either in a forward or backward direction, but may otherwise not be steerable. However, the one or more front wheels 56 may be steerable responsive to control by the control circuitry 12. Alternatively, the front wheels 56 may be swivel wheels capable of following any direction as required by the control of the rear wheels 58.

In an example embodiment, the base plate 50 may further include one or more sensors 60 that may be used to detect the boundary 30 and/or objects that may form part of the boundary of the parcel. The sensors 60 may also detect various parameters, conditions, objects and/or the like that may be encountered during operation of the robotic vehicle 10 within the boundary 30 of the parcel 20. In relation to object detection, the objects may be fixed or temporary (e.g., movable) objects. In some cases, the sensors 60 may include a front sensor and a rear sensor. However, it should be appreciated that any number of sensors may be employed and they may be disposed at any desirable location on the robotic vehicle 10. The sensors 60 may include sensors related to positional determination (e.g., a GPS receiver, an accelerometer, a camera, a radar transmitter/detector, an ultrasonic sensor, a laser scanner and/or the like). Thus, for example, positional determinations may be made using GPS, inertial navigation, optical flow, radio navigation, visual location (e.g., VSLAM) and/or other positioning techniques or combinations thereof. Accordingly, the sensors 60 may be used, at least in part, for determining the location of the robotic vehicle 10 relative to boundaries or other points of interest (e.g., a starting point or other key features) of the parcel 20, or determining a position history or track of the robotic vehicle 10 over time.

The base plate 50 may further support a cutting motor 62 configured to drive a cutting blade or other cutters of the robotic vehicle 10. In some embodiments, the outer housing 54 and the inner housing 52 may be plastic, light metal, or other similarly lightweight components. The inner housing 52 may include a cover 64 for the cutting motor 62. In some embodiments, a user interface (e.g., display 66) may be provided on the inner housing 3. The user interface may be employed to interface with the control circuitry 12 for controlling operations of the robotic vehicle 10.

In some embodiments, the sensors 60 may include sensors specifically provided for detecting objects (other than the boundary 30 or objects forming boundaries of the parcel 20) and/or sensors for detecting lifting (or tipping beyond a threshold amount) of the robotic vehicle 10. Alternatively, separate sensors (e.g., collision sensors 70 and lifting sensors 72) may be provided for each function, and those sensors may be capable of communicating with the control circuitry 12 in addition to the sensors 60. In some embodiments, a camera may be provided at a portion of the robotic vehicle 10. In an example embodiment, the camera 74 may be positioned at a forward portion of the robotic vehicle 10 to collect image data in front of the robotic vehicle 10. However, camera 74 may also be positioned in other locations in other embodiments.

Figure 3:
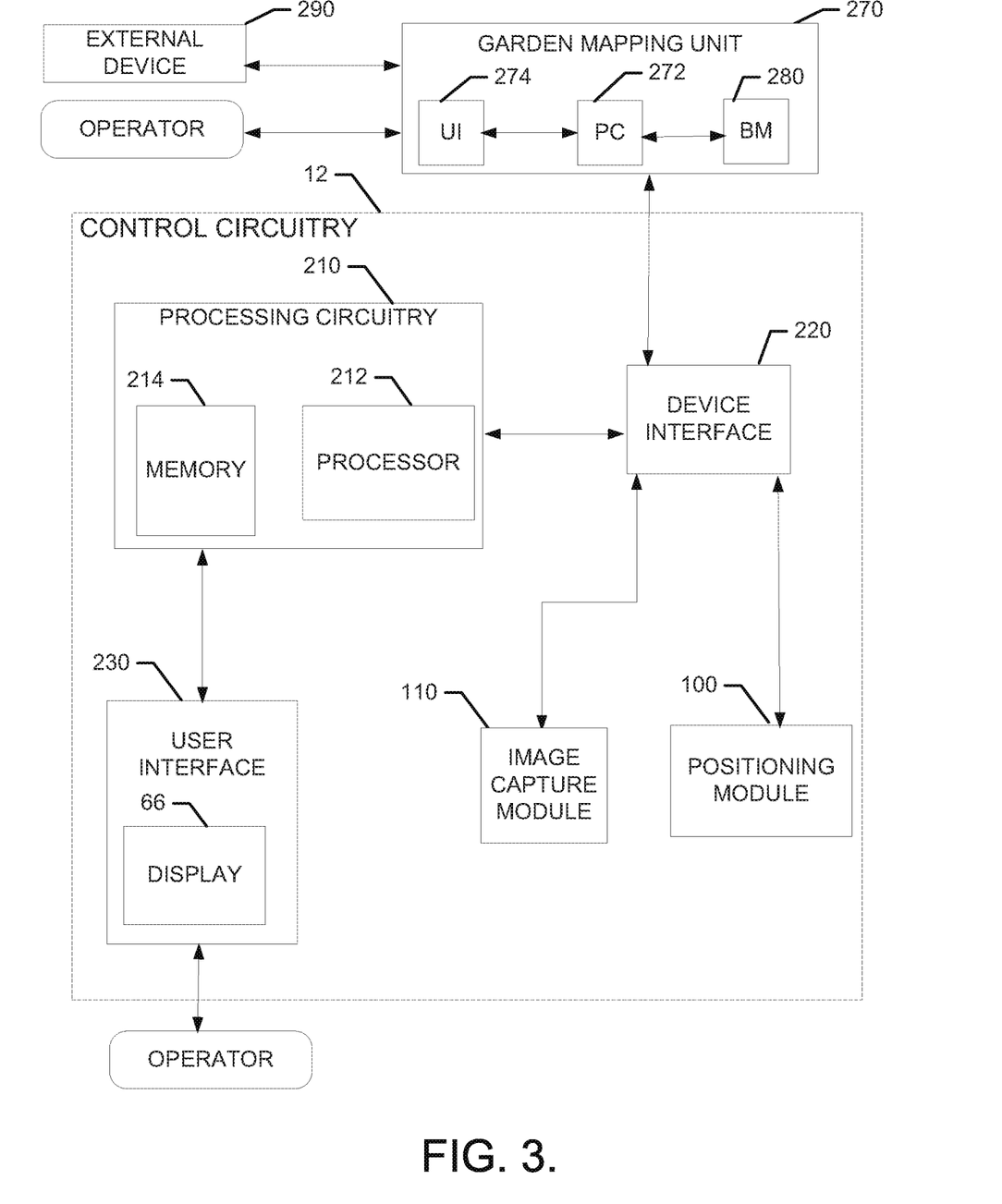
FIG. 3 illustrates a block diagram of various components of processing circuitry of the robotic vehicle to illustrate some of the components that enable the functional performance of the robotic vehicle and to facilitate description of an example embodiment.

FIG. 3 illustrates a block diagram of various components of the control circuitry 12 to illustrate some of the components that enable the functional performance of the robotic vehicle 10 and to facilitate description of an example embodiment. In some example embodiments, the control circuitry 12 may include or otherwise be in communication with positioning module 100 and an image capture module 110 disposed at the robotic vehicle 10. As such, for example, the functions attributable to the positioning module 100 and/or the image capture module 110 may be carried out by the control circuitry 12.

The control circuitry 12 may include processing circuitry 210 that may be configured to perform data processing, control function execution and/or other processing and management services according to an example embodiment of the present invention. In some embodiments, the processing circuitry 210 may be embodied as a chip or chip set. In other words, the processing circuitry 210 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 210 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 210 may include one or more instances of a processor 212 and memory 214 that may be in communication with or otherwise control a device interface 220 and, in some cases, a user interface 230 (e.g., display 66). As such, the processing circuitry 210 may be embodied as a circuit chip (e.g., an integrated circuit chip) configured (e.g., with hardware, software or a combination of hardware and software) to perform operations described herein. However, in some embodiments, the processing circuitry 210 may be embodied as a portion of an on-board computer. In some embodiments, the processing circuitry 210 may communicate with electronic components and/or sensors (e.g., camera 74) of the robotic vehicle 10 via a single data bus. As such, the data bus may connect to a plurality or all of the switching components and/or other electrically controlled components of the robotic vehicle 10.

The processor 212 may be embodied in a number of different ways. For example, the processor 212 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 212 may be configured to execute instructions stored in the memory 214 or otherwise accessible to the processor 212. As such, whether configured by hardware or by a combination of hardware and software, the processor 212 may represent an entity (e.g., physically embodied in circuitry—in the form of processing circuitry 210) capable of performing operations according to embodiments of the present invention while configured accordingly. Thus, for example, when the processor 212 is embodied as an ASIC, FPGA or the like, the processor 212 may be specifically configured hardware for conducting the operations described herein. Alternatively, as another example, when the processor 212 is embodied as an executor of software instructions, the instructions may specifically configure the processor 212 to perform the operations described herein.

In an example embodiment, the processor 212 (or the processing circuitry 210) may be embodied as, include or otherwise control the positioning module 100 and the image capture module 110. As such, in some embodiments, the processor 212 (or the processing circuitry 210) may be said to cause each of the operations described in connection with the positioning module 100 and the image capture module 110 by directing the positioning module 100 and the image capture module 110, respectively, to undertake the corresponding functionalities responsive to execution of instructions or algorithms configuring the processor 212 (or processing circuitry 210) accordingly.

In an exemplary embodiment, the memory 214 may include one or more non-transitory memory devices such as, for example, volatile and/or non-volatile memory that may be either fixed or removable. The memory 214 may be configured to store information, data, applications, instructions or the like for enabling the positioning module 100 and/or the image capture module 110 to carry out various functions in accordance with exemplary embodiments of the present invention. For example, the memory 214 could be configured to buffer input data for processing by the processor 212. Additionally or alternatively, the memory 214 could be configured to store instructions for execution by the processor 212. As yet another alternative, the memory 214 may include one or more databases that may store a variety of data sets responsive to input from various sensors or components of the robotic vehicle 10. Among the contents of the memory 214, applications may be stored for execution by the processor 212 in order to carry out the functionality associated with each respective application. In some cases, the applications may include an algorithm for capturing image data and correlating the image data to the corresponding location of the robotic vehicle 10 at the time the image data was captured. Thus, the applications may include an algorithm to correlate image data with vehicle position. However, in some cases, the applications may merely include applications for passing such data along to a garden mapping unit 270, which may perform the correlation described above among other things. The applications and/or algorithms may therefore include instructions for performing the functionality described herein when executed.

The user interface 230 (if implemented) may be in communication with the processing circuitry 210 to receive an indication of a user input at the user interface 230 and/or to provide an audible, visual, mechanical or other output to the user. As such, the user interface 230 may include, for example, a display (e.g., display 66), one or more buttons or keys (e.g., function buttons), and/or other input/output mechanisms (e.g., microphone, speakers, cursor, joystick, lights and/or the like).

The device interface 220 may include one or more interface mechanisms for enabling communication with other devices either locally or remotely (e.g., the garden mapping unit 270). In some cases, the device interface 220 may be any means such as a device or circuitry embodied in either hardware, or a combination of hardware and software that is configured to receive and/or transmit data from/to sensors or other components in communication with the processing circuitry 210. In some example embodiments, the device interface 220 may provide interfaces for communication of data from the positioning module 100 and/or the image capture module 110 (as shown in the example of FIG. 3) to the garden mapping unit 270 via wired or wireless communication interfaces in a real-time manner, as a data package downloaded after data gathering or in one or more burst transmission of any kind.

The positioning module 100 may be configured to utilize one or more sensors to determine a location of the robotic vehicle 10 and direct continued motion of the robotic vehicle 10 to achieve appropriate coverage of the parcel 20. As such, the robotic vehicle 100 (or more specifically, the control circuitry 12) may use the location information to determine a mower track and provide full coverage of the parcel 20 to ensure the entire parcel is mowed. The positioning module 100 may therefore be configured to direct movement of the robotic vehicle 10, including the speed of the robotic vehicle 10. Various sensors of the robotic vehicle 10 may be included as a portion of, or otherwise communicate with, the positioning module 100 to, for example, determine vehicle speed/direction, vehicle location, vehicle orientation and/or the like. Sensors may also be used to determine motor run time, machine work time, and other operational parameters. In some embodiments, positioning and/or orientation sensors (e.g., global positioning system (GPS) receiver and/or accelerometer) may be included to monitor, display and/or record data regarding vehicle position and/or orientation as part of the positioning module 100.

The image capture module 110 may employ a camera to capture image data regarding the area around the robotic vehicle 10. The image data captured may be still images or video data. In any case, the image data may have metadata or other indicators associated therewith to enable the image data to be correlated to the time and/or date on which the image data was captured.

The garden mapping unit 270 may be a local module of the control circuitry 12 and may therefore be controlled by the processing circuitry 210 similar to the way the processing circuitry 210 controls operation of the positioning module 100 and image capture module 110 as described above. However, in other embodiments, the garden mapping unit 270 may be located remotely and may include its own separate instances of processing circuitry (e.g., processing circuitry 272), processor(s) and/or memory devices that may be similar to those described above in terms of form and/or function. The garden mapping unit 270 may also include its own user interface 274 to enable a remote operator to interact with the garden mapping unit 270. As such, for example, the garden mapping unit 270 may be provided at any of the example devices described above as instances of the electronic device 42 and the user interface 274 and processing circuitry 272 may be the corresponding user interface and processing circuitry of the electronic device 42.

Regardless of where the garden mapping unit 270 is instantiated, processing circuitry 272 of the garden mapping unit 270 may be configured to generate a base-map 280 of the parcel 20 based on the image data and position information received from the image capture module 110 and the positioning module 100, respectively. In this regard, position and heading information may be integrated with image data to generate a two or three dimensional base-map 280 of the parcel. The base-map 280 may then be interacted with by the user to enable the user to accomplish various tasks.

The base map 280 may be generated using location information generated by the positioning module 100 along with corresponding data gathered regarding the environment of the robotic vehicle 10 at each respective location (or proximate thereto). Thus, for example, images regarding the surroundings of the robotic vehicle 10 at each respective location (and orientation) may be used to generate the base map 280. In some cases, the control circuitry 12 may also include or interface with other sensors that may also be employed for gathering data that can be used for generation of the base map 280. For example, a 2.5D sensor (e.g., LEDDAR), an inertial measurement unit (IMU), and/or other object detection/classification equipment may be employed to enable the robotic vehicle 10 to capture data regarding its surroundings and generate the base map 280 based on the captured data. The accumulation and aggregation of data from these potentially different sources may enable the robotic vehicle 10 to generate the base map 280 accurately, and to a high degree of detail. The user interaction with the base map 280 can therefore also be enhanced as the user can appreciate that the base map 280 can be easily generated in a substantially automatic way, and the base map 280 is also an accurate representation of the parcel 20 and can be updated by further operation of the robotic vehicle 10.

In some example embodiments, the base-map 280 may be further enhanced based on input from external sources such as external device 290. The external device 290 could be a smartphone, tablet, laptop, or other device with an image sensor (e.g., a high resolution camera) that may be further enabled to gather image and/or position information for incorporation into the base-map. As an example, the external device 290 may use VSLAM or other positioning technologies to generate accurate position and image data for incorporation with the image and position data that is gathered solely by the robotic vehicle 10. Due to the relatively low perspective of the robotic vehicle 10, the additional data from the external device 290 may provide better perspective, angles and/or resolution for generation of the base map 280 with enhanced accuracy and/or for a more complete model. The garden mapping unit 270 may be configured to synchronize the data from the external device 290 with the position information and image data from the robotic vehicle 10 so that all the data is properly correlated and reinforcing rather than conflicting.

The base-map 280 may include a graphical representation of the parcel 20 and the graphical representation may identify various structures or areas on the parcel 20. The structures may be man-made or natural and may be permanent or temporary. The areas may correspond to different work areas, areas of exclusion or any other type of area distinctions that may be defined by the operator. In some cases, content items (e.g., image data corresponding to actual camera images or video content) may be correlated with various locations on the graphical representation. The content items may be visually represented on the graphical representation or may be selectable from or in association with the graphical representation of the base-map 280. Thus, for example, the operator may select a content item and view an image captured of, from or otherwise in association with a particular location via interaction with the base-map 280.

In embodiments in which the graphical representation is a 2D representation, annotations on the representation may indicate the various structures and/or areas associated with the parcel 20 based on the base-map 280. Content items may be selectable or thumbnail views may be provided for selection in association with various locations. In embodiments in which the graphical representation is a 3D representation, the content items may be used to generate three dimensional views of the parcel 20 or the 3D representation could include a topographical map and various content items associated with each location may again be accessible by selection of the content items.

In some cases, the base-map 280 may have a timeline component or timeline function that allows content items or model data associated with a given time or timeframe to be stored (and later accessed). Accordingly, for example, any content items generated at the selected time or in the selected timeframe may be presented or otherwise accessible via interaction with the base-map 280. The operator may, therefore, be enabled to browse content items associated with a particular time or timeframe to compare changes to the parcel 20 over time or to identify or appreciate seasonal, weather related or other man-made or natural changes that may occur to the parcel 20. In the case where special sensors are employed for detecting soil pH, moisture content, or other parameters, information associated with sensor readings at various locations may also be recorded in association with the corresponding times at which the data was gathered. Data gathered regarding soil pH and moisture content, for example, can be beneficial when the user generates a modified-map to ensure any specific vegetation selected by the user for possible inclusion on the parcel can be based, at least in part, on such data. For example, certain vegetation may not viably grow and/or survive in certain soil pH ranges and/or moisture content. In this regard, the proposed configuration for the parcel generated by the user can avoid plans including certain types of vegetation that may not be viable candidates for a given location on the parcel.

Figure 4:
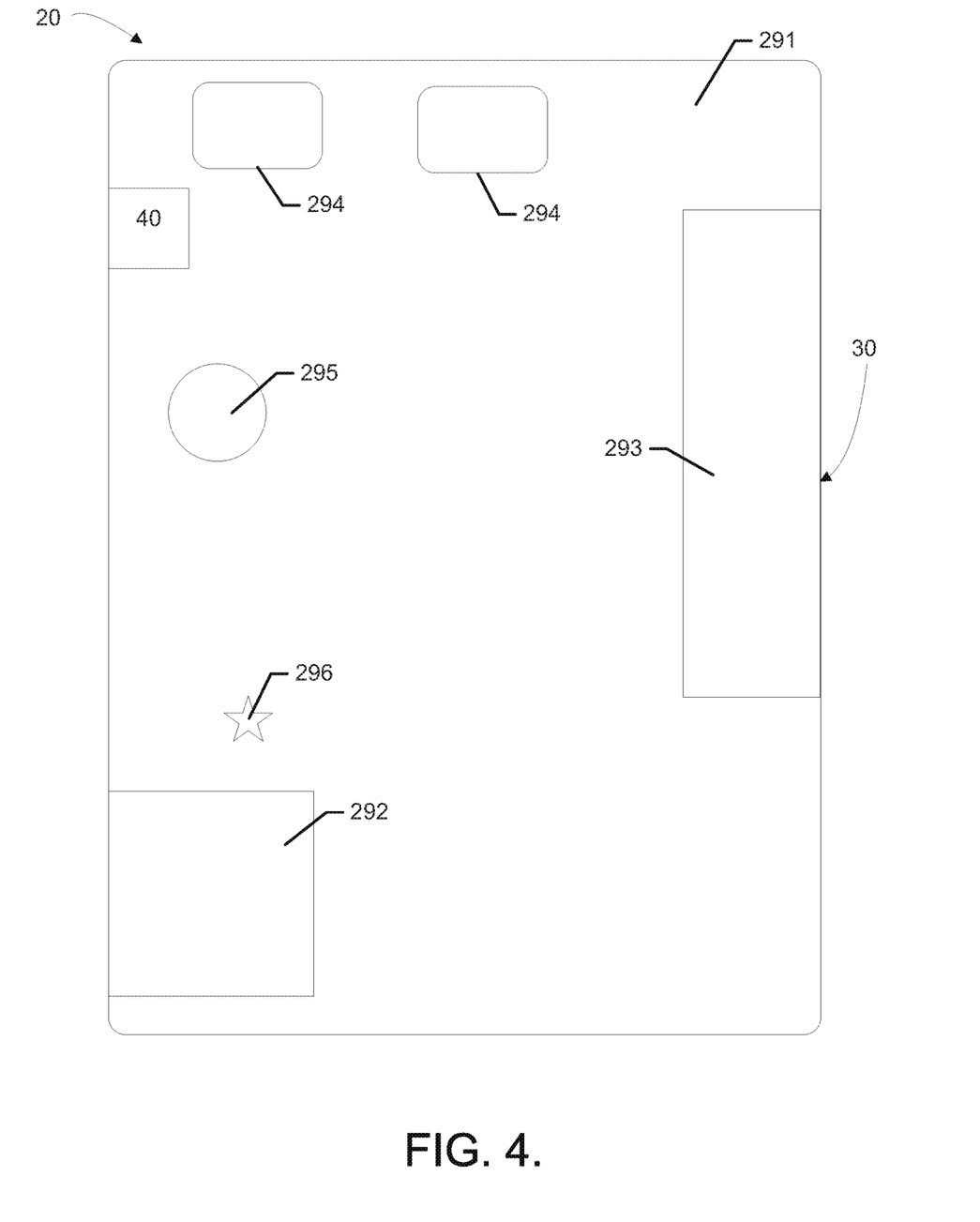
FIG. 4 illustrates a graphical representation of a base-map for a parcel in accordance with an example embodiment.

FIG. 4 illustrates a graphical representation of a base-map for a parcel in accordance with an example embodiment. The graphical representation of FIG. 4 is a 2D representation similar to a map view, but could easily be converted to 3D by the addition of topographical contour lines or other features (e.g., image views) to indicate features having a height dimension. The parcel 20 of FIG. 4 has the boundary 30 and charge station 40 indicated as described above. However, the parcel 20 also has a work area 291 defined along with a first exclusion area 292 and a second exclusion area 293. The first and second exclusion areas 292 and 293 may be designated by the operator as cultivated areas that the robotic vehicle 10 is to avoid or they may be structures (e.g., buildings, decks, pools, etc.) that may be detected and appreciated by the robotic vehicle 10 as being inaccessible areas. However, the work area 291 may be defined as an area that is to be mowed in its entirety. Various structures (e.g., bushes 294, trees 295, etc.) are also represented, and may be appreciated by the robotic vehicle 10 as inaccessible areas due to the existence of a structure at the location.

In some embodiments, each location in the parcel 20 may be assigned a grid position or other regional identifier. Content items may be associated with the grid positions and may be accessed by the operator interacting with (e.g., selecting or requesting) the content items associated with each grid position. As mentioned above, the content items may be registered sequentially by time and by location. In some cases, the most recent content item for any particular grid position may be the default content item shown for each location when the operator selects a grid location. Alternatively, an icon, thumbnail view or other indicator (e.g., content item indicator 296) may be placed on the map view itself, and the user may select the indicator to view image data for the location. Selection of the indicator 296 may show the most recently gathered image associated with the location. In some cases, the operator may cycle through other images associated with the location in a manner similar to a slide show presentation arranged by time. However, the operator could also designate specific times or time ranges, as described above.

In some embodiments, the robotic vehicle 10 may traverse the parcel 20 gathering image data and all such data may be recorded in association with the location at which it was gathered, as described above. The robotic vehicle 10 could transmit the image and location information to the charge station 40 or another remote device during operation (wirelessly) or could download the information to the charge station 40 (wired) while charging. In some cases, the operator could even direct the robotic vehicle 10 to proceed to a specific location to obtain image data and direct the gathering of content items.

Accordingly, in some embodiments, the operator may be enabled to take a virtual tour through the various locations of the parcel 20 and retrieve data and/or images that are associated with each of the various locations. The operator may, for example, pass a mouse over various locations on a map view of the base-map 280 and select or otherwise be automatically presented with content items associated with each of the various locations. Moreover, when the timeline function is employed, the virtual tour may be associated with a specifically selected time or time period. However, real time touring may also be possible if the operator selects to view live data or even direct the robotic vehicle 10 to conduct a tour and send real-time or recent data for viewing. The live view or real-time data may also be used, for example, to generate a first person view that the operator could employ via a remote device to direct operation of the robotic vehicle 10.

The timeline function may serve as an event log so that potential problems or changes of interest may be identified either automatically or by the operator. For example, logged data may include pictures or image data taken of various structures or situations on the parcel 20. The image data may be presented to the operator so the operator can identify or appreciate the changes, or image processing techniques may be employed to compare images of the same area at different times to identify objects or other changes and the operator may be notified of such changes (e.g., via email, MMS or other alerting mechanisms). Accordingly, for example, the garden mapping unit 270 may be configured to perform automatic change detection (e.g., based on image comparisons) and notification based, in some cases, on logged data. The logged data may therefore include images, sensor readings, component activity data and/or the like for given times or periods of time. Accordingly, for example, problems such as the robotic vehicle 10 getting stuck, areas with bad GPS coverage, areas with poor grass quality, swampy or dry areas, and/or the like may be identified and associated with the locations and times during which such conditions occurred. The information may be used to define areas that the robotic vehicle 10 should avoid or take special actions when entering such areas. The occurrence of certain natural or artificial phenomena may therefore be monitored, such as the falling of a tree limb, the intrusion of an animal or person into a garden, or the leaving of toys, furniture or other objects on the parcel 20.

Based on the description above, it should be appreciated that the garden mapping unit 270 may be configured to enable image data to be combined with position data to generate location aware processing of data for creation of a virtual garden in the form of a base-map 280. The virtual garden may be a 2D or 3D representation of the garden and may include content items that include image data and perhaps other sensor data that is correlated by time and/or location with the representation of the garden. The operator may therefore be enabled to conduct a virtual inspection of the garden from anywhere in the world in an intuitive and natural way. Various problems, obstacles and items in the garden may be automatically or manually identified by reviewing image data content items so that the overall quality of lawn and garden activities (e.g., mowing) may be improved. Additionally, automatic masking of image data for objects outside boundaries of the parcel 20 on which the robotic vehicle 10 operates may also be accomplished to address any privacy concerns.

Figure 5:
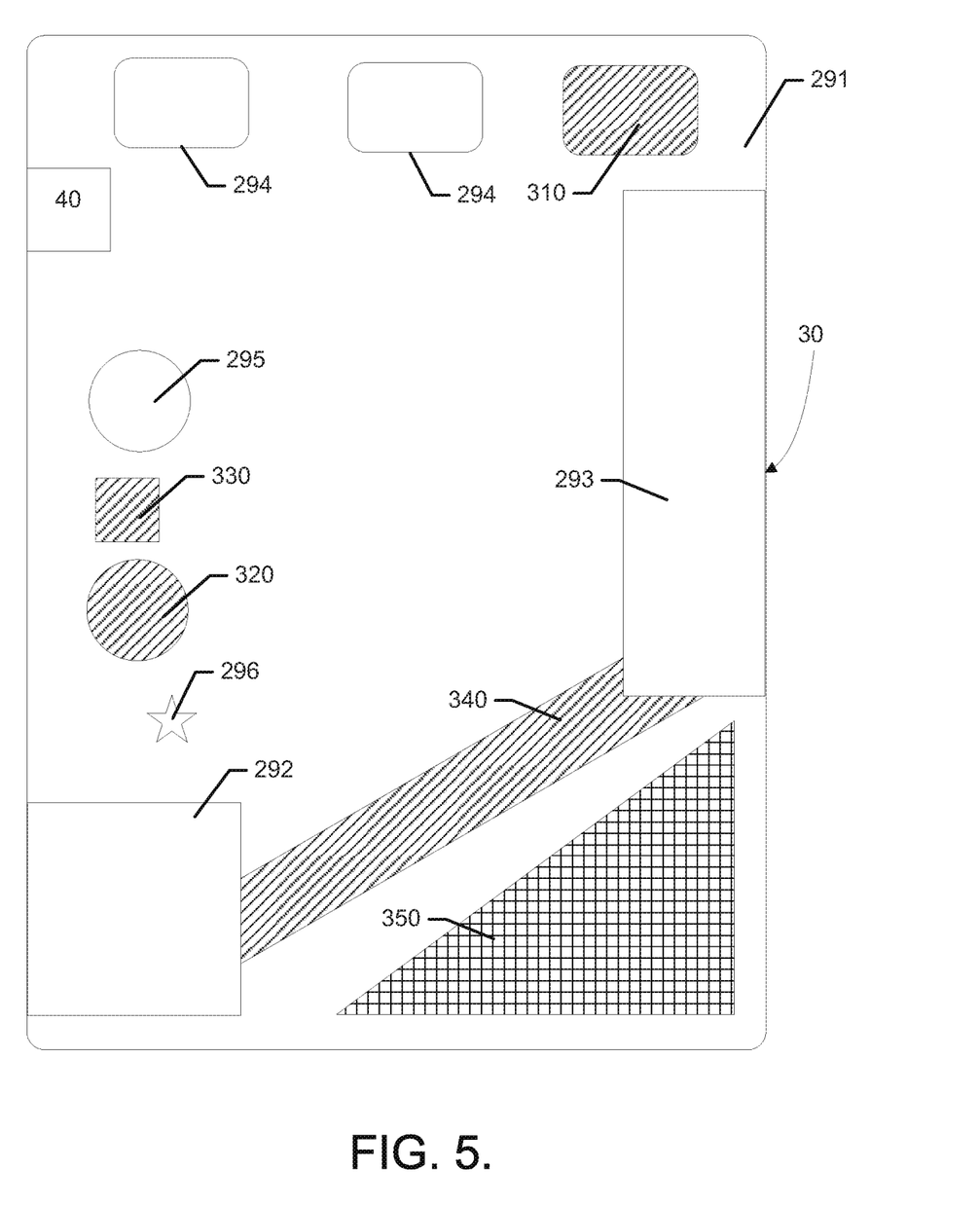
FIG. 5 illustrates a modified-graphical representation of a modified-map according to an example embodiment.

In some embodiments, the user can interact with the graphical illustration of the base-map 280, for example, via user interface 274 of the garden mapping unit 270 to generate a modified-map that comprises a proposed future plan or configuration for the parcel, such as particular garden design or landscaping design. In this regard, the user may interact with the base-map to undertake a variety of activities including, for example, virtually reorganizing, virtually adding one or more virtual content objects (e.g., vegetation, building structures, etc.), and/or virtually removing existing objects identified on the base-map. The user may also define virtual discrete areas within the parcel, in which the virtual discrete areas can include one or more virtual content objects (e.g., the discrete are may comprise a proposed flower bed including a variety of proposed flowers therein). For example, FIG. 5 illustrates a modified-graphical representation of a modified-map including modifications made to the graphical representation of FIG. 4 by a user. For example, FIG. 5 illustrates the virtual addition of a proposed bush 310, a proposed tree 320, a proposed fireplace 330, and a proposed walkway 340. As also illustrated in FIG. 5, the modified-graphical representation includes a proposed discrete area 350 defined within the parcel in which one or more virtual content objects (e.g., vegetation) are located therein.

Embodiments of the present invention may therefore be practiced using an apparatus such as the one depicted in FIG. 3. However, other embodiments may be practiced in connection with a computer program product for performing embodiments of the present invention. As such, for example, each block or step of the flowchart of FIG. 6, and combinations of blocks in the flowchart, may be implemented by various means, such as hardware, firmware, processor, circuitry and/or another device associated with execution of software including one or more computer program instructions. Thus, for example, one or more of the procedures described above may be embodied by computer program instructions, which may embody the procedures described above and may be stored by a storage device (e.g., memory 214) and executed by processing circuitry (e.g., processor 212).

As will be appreciated, any such stored computer program instructions may be loaded onto a computer or other programmable apparatus (i.e., hardware) to produce a machine, such that the instructions which execute on the computer or other programmable apparatus implement the functions specified in the flowchart block(s) or step(s). These computer program instructions may also be stored in a computer-readable medium comprising memory that may direct a computer or other programmable apparatus to function in a particular manner, such that the instructions stored in the computer-readable memory produce an article of manufacture including instructions to implement the function specified in the flowchart block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s). In this regard, a method according to example embodiments of the invention may include any or all of the operations shown in FIG. 6. Moreover, other methods derived from the descriptions provided herein may also be performed responsive to execution of steps associated with such methods by a computer programmed to be transformed into a machine specifically configured to perform such methods.

Figure 6:
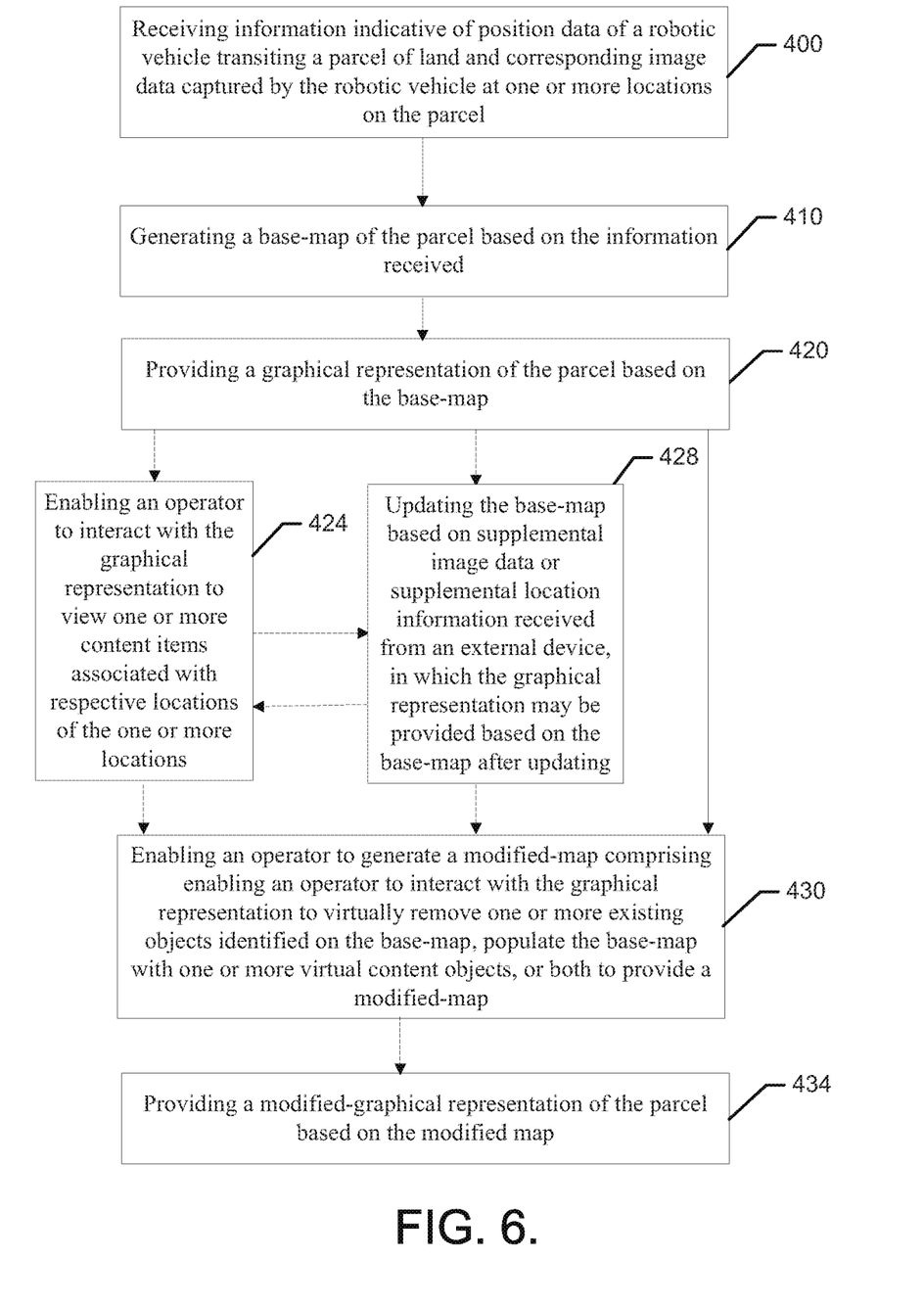
FIG. 6 illustrates a block diagram of a method according to an example embodiment.

In some example embodiments, methods for processing image data and position information to generate an interactive garden (e.g., base-map) or other visualization of a garden or parcel may include object detection-related information. As shown in FIG. 6, some example embodiments may include receiving information indicative of position data of a robotic vehicle transiting a parcel of land and corresponding image data captured by the robotic vehicle at one or more locations on the parcel 400 and generating a base-map of the parcel based on the information received 410. The method illustrated in FIG. 6 also includes providing a graphical representation (e.g., two dimensional or three dimensional) of the parcel based, at least in part, on the base-map. As illustrated by dashed lines in FIG. 6, the methods illustrated by FIG. 6 may include one or more optional steps. For instance, the methods may optionally include enabling an operator to interact with the graphical representation to view on or more content items associated with respective locations of the one or more locations 424. The methods may also optionally include updating the base-map based on supplemental image data or supplemental location information received from an external device, in which the graphical representation is provided based at least partially on the base-map after updating 428. FIG. 6 also illustrates that methods according to some embodiments may include enabling an operator to generate a modified-map comprises enabling an operator to interact with the graphical representation to virtually remove one or more existing objects identified on the base-map, populate the base-map with one or more virtual content objects, or both to provide the modified-map 430. In some embodiments, the method may further include providing a modified-graphical representation of the parcel based, at least in part, on the modified-map.

The operations 400-434 may also be modified, augmented or amplified in some cases. For example, in some embodiments, the method may further include (1) generating the base-map at a charge station or a remote device relative to the robotic vehicle responsive to the information received being received from the robotic vehicle. In some embodiments, whether or not the method is modified to include (1), (2) the method may include providing the graphical representation comprising providing an event log defining a series of events in association with the respective ones of the one or more locations. In some cases, the event log includes a plurality of images associated with the respective ones of the one or more locations at a selected time or range of times. Additionally or alternatively, the event log may further include sensor data gathered at the respective ones of the one or more locations at the selected time or range of times. In some embodiments, whether or not the method is modified to include (1) and/or (2), the method may include (3) enabling the operator to interact with the graphical representation comprising enabling the operator to define an area within the parcel and associate one or more virtual content objects to be located therein. In some cases, any or all of (1) to (3) may be employed. Moreover, the modified-map may comprise a landscaping plan for the parcel, including one or more virtual content objects. The virtual content objects can comprise, for example, vegetation (e.g., grass, bushes, trees, plants, or any combinations thereof). Additionally, the virtual content items can comprise one or more building structures.

In an example embodiment, an apparatus for performing the methods of FIG. 6 above may comprise processing circuitry (e.g., processing circuitry 272) that may include a processor (e.g., an instance of the processor 212 at the device hosting the garden mapping unit 270) configured to perform some or each of the operations (400-434) described above. The processing circuitry 272 may, for example, be configured to perform the operations (400-434) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (400-434) may comprise, for example, the control circuitry 12 or the processing circuitry 272.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A method comprising:
    receiving information indicative of position data of a robotic vehicle transiting an outdoor parcel and corresponding image data captured by the robotic vehicle at one or more locations on the outdoor parcel;
    receiving supplemental information comprising supplemental image data with supplemental location information at one or more locations of an external device on the parcel, the external device having captured the supplemental image data via an external device image sensor, the supplemental information further comprising soil characteristic data captured by a soil detection sensor, the soil characteristic data indicating characteristics about soil at a sensor location within the outdoor parcel;
    generating a base-map of the parcel based on the information received, wherein generating the base-map comprises synchronizing the information received with the supplemental information and incorporating the supplemental information into the base-map to enhance the base-map with the supplemental information;
    providing a graphical representation of the parcel based on the base-map; and
    enabling an operator to generate a modified-map, wherein enabling the operator to generate the modified-map includes permitting selection of vegetation to be virtually added to the modified-map based on the soil characteristic data.

2. The method of claim 1, wherein enabling the operator to generate the modified-map comprises enabling an operator to interact with the graphical representation to virtually remove one or more existing objects identified on the base-map, populate the base-map with one or more virtual content objects, or both to provide the modified-map.

3. The method of claim 1, wherein the modified-map comprises a landscaping plan for the parcel.

4. The method of claim 1, further comprising enabling the operator to interact with the graphical representation to view one or more content items associated with respective ones of the one or more locations.

5. The method of claim 2, wherein the virtual content objects comprise vegetation including grass, bushes, trees, flowers, plants, or any combination thereof.

6. The method of claim 2, wherein the virtual content objects comprise one or more building structures.

7. The method of claim 1, wherein generating the base-map comprises generating the base-map at a charge station or a remote device relative to the robotic vehicle responsive to the information received being received from the robotic vehicle.

8. The method of claim 1, wherein providing the graphical representation comprises generating a two dimensional or three dimensional interactive representation of the parcel.

9. The method of claim 1, wherein providing the graphical representation comprises providing an event log defining a series of events in association with the respective ones of the one or more locations.

10. The method of claim 1, wherein providing the graphical representation comprises providing the graphical representation of the parcel at selected times and for a selected content item, in response to receipt of a user selection of the selected content item and the selected time, to indicate changes to the parcel over time.

11. The method of claim 1, wherein providing the graphical representation comprises providing an event log defining a series of events in association with the respective ones of the one or more locations;
wherein the event log includes a plurality of images associated with the respective ones of the one or more locations at a selected time or range of times; and
wherein the event log further includes sensor data gathered at the respective ones of the one or more locations at the selected time or range of times.

12. The method of claim 4, wherein enabling the operator to interact with the graphical representation comprises enabling the operator to define an area within the parcel and associate one or more virtual content objects to be located therein.

13. The method of claim 1, wherein generating the base map comprises generating the base map based on aggregating data regarding objects surrounding the robotic vehicle from multiple sensors on the robotic vehicle.

14. An apparatus comprising processing circuitry configured for:
receiving information indicative of position data of a robotic vehicle transiting an outdoor parcel and corresponding image data captured by the robotic vehicle at one or more locations on the outdoor parcel;
receiving supplemental information comprising supplemental image data with supplemental location information at one or more locations of an external device on the parcel, the external device having captured the supplemental image data via an external device image sensor, the supplemental information further comprising soil characteristic data captured by a soil detection sensor, the soil characteristic data indicating characteristics about soil at a sensor location within the outdoor parcel;
generating a base-map of the parcel based on the information received, wherein generating the base-map comprises synchronizing the information received with the supplemental information and incorporating the supplemental information into the base-map to enhance the base-map with the supplemental information;
providing a graphical representation of the parcel based on the base-map; and
enabling an operator to generate a modified-map, wherein enabling the operator to generate the modified-map includes permitting selection of vegetation to be virtually added to the modified-map based on the soil characteristic data.

15. The apparatus of claim 14, wherein the processing circuitry is further configured for enabling the operator to generate the modified-map comprising enabling the operator to interact with the graphical representation to virtually remove one or more existing objects identified on the base-map, populate the base-map with one or more virtual content objects, or both to provide the modified-map.

16. The apparatus of claim 14, wherein the modified-map comprises a landscaping plan for the parcel.

17. The apparatus of claim 14, wherein the processing circuitry is further configured for enabling the operator to interact with the graphical representation to view one or more content items associated with respective ones of the one or more locations.

18. The apparatus of claim 14, wherein the supplemental image data is captured at different perspectives relative to perspectives of the image data captured by the robotic vehicle; and
wherein the processing circuitry configured for synchronizing and incorporating the supplemental information includes being configured for using position data of the supplemental information for incorporation of the supplemental information with the information received from the robotic vehicle to generate the base-map with perspectives from the robotic vehicle and the supplemental information.

19. The apparatus of claim 14, wherein the information indicative of the position data of the robotic vehicle includes information generated by a light sensor disposed on the robotic vehicle and an inertial measurement sensor disposed on the robotic vehicle;
wherein the processing circuitry is further configured to accumulate and aggregate the information generated by a light sensor and an inertial measurement sensor for use in generating the base-map.

20. An apparatus comprising processing circuitry configured to:
receive information indicative of position data of a robotic vehicle transiting an outdoor parcel while operating a cutting blade to cut grass on the outdoor parcel and corresponding image data captured by the robotic vehicle at one or more locations on the outdoor parcel while operating the cutting blade to cut grass on the outdoor parcel;
receive soil moisture content information from a soil detection sensor at a sensor location within the outdoor parcel;
generate a base-map of the parcel based on the position data, the corresponding image data, and the soil moisture content information;

provide a graphical representation of the parcel based on the base-map; and enable an operator to generate a modified-map, wherein being configured to enable the operator to generate the modified-map includes being configured to permit selection of vegetation to be virtually added to the modified-map by a user based on the soil moisture content data.

* * * * *